United States Patent
Chiang et al.

(10) Patent No.: US 9,820,291 B2
(45) Date of Patent: Nov. 14, 2017

(54) SYSTEM AND METHOD FOR SCHEDULING MOBILE DATA DURING A SPECTRUM VALLEY

(71) Applicants: Mung Chiang, Princeton, NJ (US); Sangtae Ha, Princeton, NJ (US); Carlee Joe-Wong, Princeton, NJ (US); Shantigram Jagannath, Bangalore (IN); Wim Sweldens, New Providence, NJ (US)

(72) Inventors: Mung Chiang, Princeton, NJ (US); Sangtae Ha, Princeton, NJ (US); Carlee Joe-Wong, Princeton, NJ (US); Shantigram Jagannath, Bangalore (IN); Wim Sweldens, New Providence, NJ (US)

(73) Assignee: TUBE, INC., Chelmsford, MA (US)

(*) Notice: Subject to any disclaimer, the term of this patent is extended or adjusted under 35 U.S.C. 154(b) by 130 days.

(21) Appl. No.: 14/575,550

(22) Filed: Dec. 18, 2014

(65) Prior Publication Data

US 2015/0173096 A1    Jun. 18, 2015

Related U.S. Application Data

(60) Provisional application No. 61/917,442, filed on Dec. 18, 2013.

(51) Int. Cl.
*H04W 4/00* (2009.01)
*H04W 72/12* (2009.01)
*H04L 29/08* (2006.01)

(52) U.S. Cl.
CPC ........... *H04W 72/12* (2013.01); *H04L 67/141* (2013.01); *H04L 67/325* (2013.01)

(58) Field of Classification Search
CPC ..................................................... H04W 72/12
USPC .................................. 370/310–350, 431–463
See application file for complete search history.

(56) References Cited

U.S. PATENT DOCUMENTS

| | | | | |
|---|---|---|---|---|
| 2009/0016249 A1* | 1/2009 | Li | ........................ | H04J 3/0638 370/310.1 |
| 2009/0149208 A1* | 6/2009 | Huttunen | ............... | H04W 24/10 455/509 |
| 2010/0135226 A1* | 6/2010 | Chandramouli | ...... | H04W 36/02 370/329 |
| 2013/0148670 A1* | 6/2013 | Chang | ................. | H04L 12/4035 370/431 |
| 2013/0279376 A1* | 10/2013 | Ahmadi | ................ | H04W 16/14 370/277 |

\* cited by examiner

*Primary Examiner* — Ricky Ngo
*Assistant Examiner* — Wei-Po Kao
(74) *Attorney, Agent, or Firm* — Meagher Emanuel Laks Goldberg & Liao, LLP

(57) ABSTRACT

A wireless communication system and method for use with radio access network with a plurality of client devices are disclosed. The system includes a scheduling controller including a processor configured to receive session information from the radio access network for each client device. The session information includes a utility associated with each session. The scheduling controller is configured to generate a schedule for a spectrum valley based on the session information.

18 Claims, 3 Drawing Sheets

Valley

SYSTEM AND METHOD FOR SCHEDULING MOBILE DATA DURING A SPECTRUM VALLEY

CROSS-REFERENCE TO PRIOR FILED APPLICATION

This application claims priority to an earlier filed provisional application 61/917,442 filed on Dec. 18, 2013, which is herein incorporated by reference in its entirety.

TECHNICAL FIELD

This invention relates generally to systems and methods for scheduling data traffic in wireless network and relates to control, optimization and data-driven approaches in communication systems and networks.

BACKGROUND

Much of 3G and 4G spectrum is idle during any 24-hour period. Further zooming into the spectrum usage's temporal pattern reveals that such low-utilization periods, referred to as "valleys" here, appear frequently. Time-to-valley can be remarkably short, and valley-durations are often long enough to be leveraged. As chatty communications, such as vine, compound the effects of over-provisioning long practiced by wireless operators, these valleys are becoming a major source of resource waste.

On the other hand, there is also a surge in pre-loadable content. Examples range from multimedia magazines, such as issues of the New Yorker, to social networks, such as friends' walls in Facebook. Subscriber-style content are pre-loadable, and if there are valleys during the time in between a content becoming available to its being consumed, such pre-loadable content can be loaded into valley time slots.

There are technologies that can detect valleys in real time. And there are technologies in general concept of scheduling. But there is no prior art on intelligently deciding when to load each mobile content to each spectrum valley timeslot. That is the subject of this disclosure.

SUMMARY OF THE INVENTION

Disclosed herein is a system that connects spectrum usage detection, content storage servers, client software, and a controller to intelligently schedule mobile data transmission during valley. In the system, contents may be tagged and accounted for by the logical unit of session. Unscheduled packets are stored at an appropriate place along the end-to-end path, either up path or down path. Possibilities include server, local proxies, or client devices. A scheduling approach (optimization routine) decides which session gets to use which time slot during valley.

The following factors may be taken into account in this approach:
Efficiency: fill all the valleys and by as much as possible
Fairness: fairness quantified by tunable knobs may be maintained across sessions, users, and content providers.
Application-specific needs: certain content are in general more time-sensitive than others (higher utility), and certain sessions already have in real time accumulated more queued-up packets than others. Such differences will help drive the scheduling decision.
Economic flexibility: some users or content providers may be willing to pay for higher priority in the schedule, and such requests can be accommodated.

In this approach, priority may be maintained in several ways. Preferred embodiments include strict priority, weighted proportional fairness, and weighted round robin.

In more detail a wireless communication system for use with radio access network with a plurality of client devices is disclosed. The system includes a scheduling controller including a processor configured to receive session information from the radio access network for each client device. The session information includes a utility associated with each session. Additional information pertaining to utility functions is contained in co-pending application Ser. No. 14/326,218 filed Jul. 8, 2014 which is incorporate herein in its entirety. The scheduling controller is configured to generate a schedule for a spectrum valley based on the session information. The system may also include a session usage detector coupled to the radio access network. The usage detector may be configured to generate the session information. The session information may generally include the utility and size $s\_i$ bytes to be transported over the mobile spectrum valley. The session may be labeled at the originating source, which could be a server for download traffic or a client device for upload traffic.

The spectrum usage detector may be a stand-alone device having an associated processor. The spectrum usage detector may also be integrated into the radio access network or the scheduling controller. The scheduling controller may generate the schedule based on a set of constraints including the utility associated with each session and at least one of: efficiency, fairness, and economic considerations. The spectrum valley may be divided into a plurality of valley time slots and the scheduling controller may generate a schedule that allocates the valley time slots to one or more sessions.

The scheduling controller may be configured to maximize a sum of the utilities associated with a given schedule. The fairness constraint may be based on a number of objects or total number of bytes accumulated over past time periods for each client device. The fairness constraint may be modified through weights assigned to different client devices or different content providers. It should be understood that all of the constraints may also be weighted and/or combined in order to determine a suitable schedule. The scheduling controller may be configured to generate a schedule for each spectrum valley as more valley timeslots are detected. The scheduling controller may be configured to pause sessions as valley timeslots come to an end and resume sessions when more valley timeslots are detected.

A wireless communication method for use with radio access network with a plurality of client devices is also disclosed. The method includes receiving session information from the radio access network for each client device. The session information includes a utility associated with each session. A schedule is generated for a spectrum valley based on the session information. A session usage detector may be provided. The session usage detector may be coupled to the radio access network. The session usage detector may be configured to generate the session information. The spectrum usage detector may be a stand-alone device having an associated processor.

The schedule may be generated based on a set of constraints including the utility associated with each session and at least one of: efficiency, fairness, and economic considerations. The spectrum valley may be is divided into a plurality of valley time slots and the schedule may allocate the valley time slots to one or more sessions. The schedule may be generated to maximize a sum of the utilities associated with a given schedule. The fairness constraint may be based on a number of objects or total number of bytes accumulated over past time periods for each client device. The fairness constraint may be modified through weights assigned to different client devices or different content providers. It should be understood that all of the constraints may also be weighted and/or combined in order to determine a suitable schedule. The schedule may be generated for each spectrum valley as more valley timeslots are detected. Sessions may be paused as valley timeslots come to an end and sessions may be resumed when more valley timeslots are detected.

BRIEF DESCRIPTION OF THE FIGURES

FIG. 3b is a block diagram of the valley that is scheduled in FIG. 3a.

DETAILED DESCRIPTION

Figure 1:
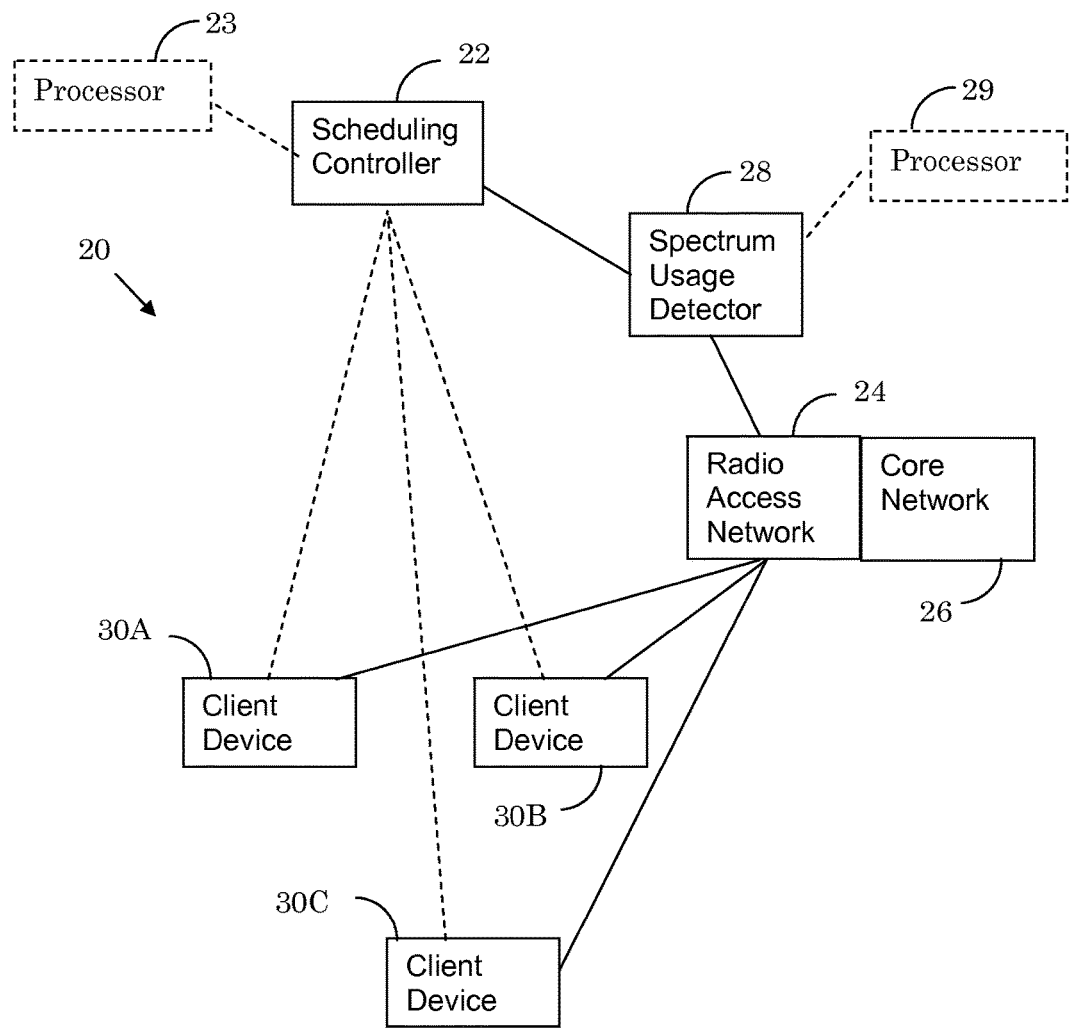
FIG. 1 is a block diagram of a wireless communication system.

FIG. 1 is a block diagram of a wireless communication system 20. The wireless communication system 20 includes a plurality of client devices shown generally by reference number 30A, 30B and 30C. It should be understood that the specific number of client devices may be varied without departing from the scope of this disclosure. It should also be understood that the wireless communication system 20 may be divided into a plurality of sectors each sector having a subset of client devices associated with a given sector. The client devices 30A, 30B and 30C are coupled to a radio access network 24 and core network 26 as is well known in the art. In this example, the system 20 also includes a scheduling controller 22 (with an associated processor 23) coupled to the spectrum usage detector 28. The spectrum usage detector 28 is coupled to the radio access network 24 and core network 26. In general, the spectrum usage detector 28 gathers spectrum usage information from the radio access network 24 and core network 26. The radio access network 24 and core network 26 which gathers usage information from each of the client devices and therefore has access to usage information for all client devices. The spectrum usage information is generated based on the usage information from each of the client devices.

In this example, the spectrum usage detector 28 is shown as a stand-alone device with its own processor 29. It should be understood the spectrum usage detector 28 may be integrated into the radio access network 24/core network 26. In the alternative the spectrum usage detector 28 may be integrated into the scheduling controller 22 without departing from the scope of this disclosure. Each client device establishes a session with the radio access network 24/core network 26. The session is established to transfer an object via the wireless communication system 20 in a mobile spectrum valley. Each session object (or file) general has size s_i bytes to be transported over the mobile spectrum valley. The session is labeled at the originating source, which could be a server for download traffic or a client device for upload traffic.

Each session also has a utility associated with successfully transmitting/receiving the object. That is, the utility of each session generally depends on the time the session must wait before completion. The utility is denoted by the function U_i. Such utility functions can be as simple as a constant value of 1, or the number of bytes s_i. The number of objects, N_k, or total number of bytes S_k, sent through valley timeslots for a user k (either a consumer of a content provider) is tracked and updated in the scheduling controller 22.

As discussed above, the wireless communication system 20 may be divided into a plurality of sectors each sector having a subset of client devices. When a valley timeslot is detected in a given sector, the client devices in that sector are listed at the scheduling controller 22. The scheduling controller 22 also stores the number of sessions and the size and utility of each session in waiting that are associated with each client device.

Figure 2:
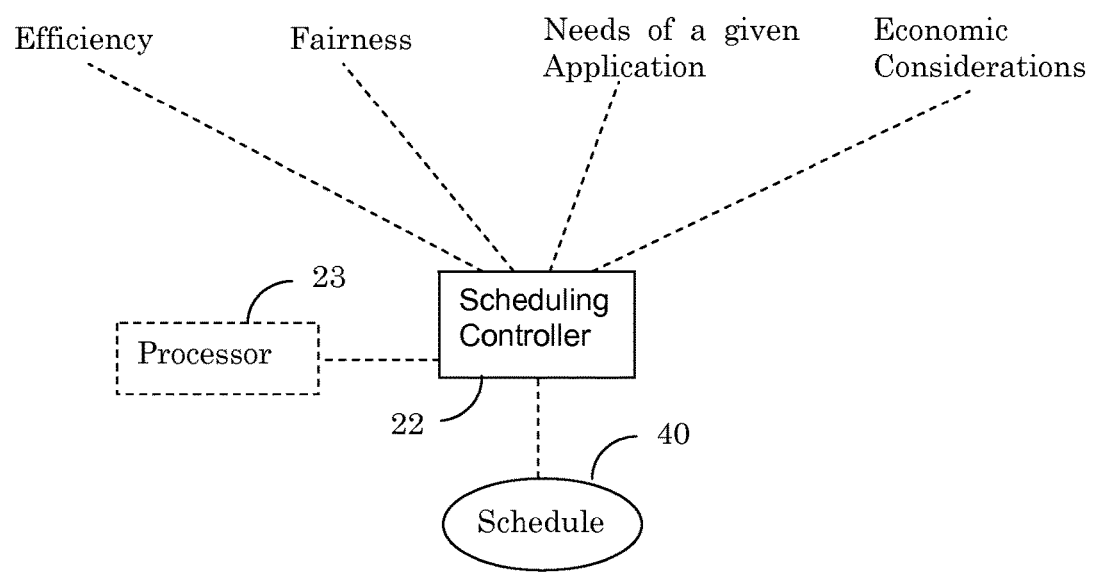
FIG. 2 is a block diagram of the functions performed by the scheduling controller.

FIG. 2 is a block diagram of the functions performed by the scheduling controller 22. The scheduling controller 22 receives a plurality of inputs that quantify the various factors or constraints that are taken into account when generating a schedule 40. These constraints include efficiency, fairness, the needs of a given application and economic considerations. The scheduling controller 22 executes an optimization routine to determine the schedule 40. In general, the schedule 40 activates one or more of the sessions in waiting. The optimization routine is configured to maximize the sum of the utilities associated with a given schedule. The optimization routine generally captures the time sensitivity of different sessions. Note that sum of the utilities achieved will be influenced by the schedule itself, as different schedules may lead to different interference situations in the sector and therefore different throughput for each session.

For example, constraints can include any of the following: (1) all the timeslots in valley must be fully utilized; (2) a fairness function (as a function of the number of objects or total number of bytes accumulated over the past K time periods) across the client devices. The fairness constraint can be modified through weights assigned to different client devices or different content providers, where higher weights are assigned to higher class of customers to this valley-filling system. The resulting schedule then is used to activate the different sessions, with the controller issuing commands to client devices (for upload) or to content provider servers (for download). The activated sessions see their bytes transported. The non-activated sessions remain queued.

If more valley timeslots are detected, the above process is repeated. If a session lasts longer than the anticipated valley timeslots, it can either be allowed to finish (and the number of bytes sent during valley is counted separate from the number of bytes sent past valley), or be paused as the valley timeslots come to an end and to be resumed when valley resumes.

Figure 3A:
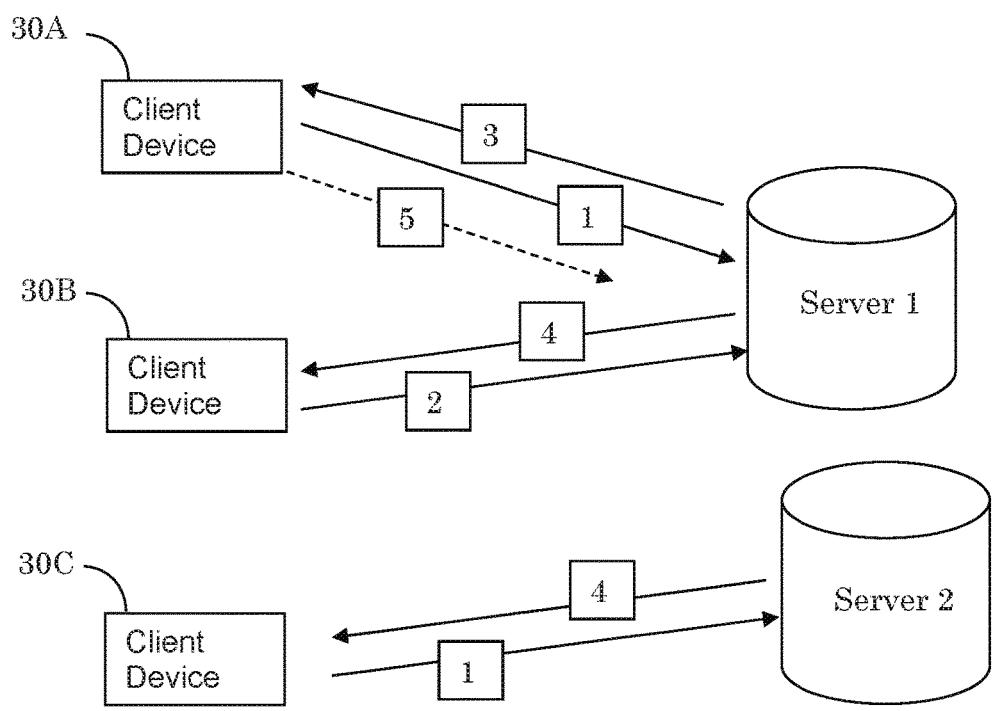
FIG. 3a is a block diagram showing an example of the scheduled traffic after a schedule is computed.
Figure 3B:
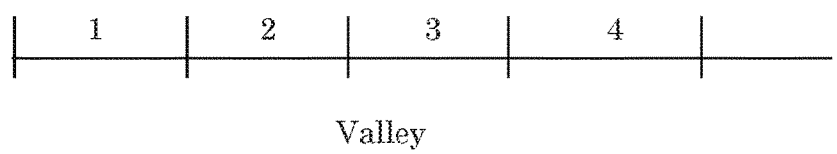

FIG. 3a is a block diagram showing an example of the scheduled traffic after a schedule 40 is computed. FIG. 3b is a block diagram of the valley that is scheduled in FIG. 3a. In this example, the valley has 4 time slots. Client devices 30A, 30B, and 30C each have 1 session in waiting. In timeslot 1, client devices 30A and 30C each initiate a session. In timeslot 2, client device 30B initiates a session. Each session in waiting has a number of bytes and a utility. The scheduling controller 22 assigns the time slots shown based on the number of bytes and the utility such that the total utility is maximized. In this example, we assume that client device 30C's session has a lower utility than client device 30A's. Thus, client device 30A's session is scheduled to complete in timeslot 3, but client device 30B's and 30C's sessions are scheduled to complete in timeslot 4. In timeslot 5, another session is initiated by client device 30A, but there is no longer a valley in network usage. This session therefore is not scheduled by the controller.

It should be understood that many variations are possible based on the disclosure herein. Although features and elements are described above in particular combinations, each feature or element can be used alone without the other features and elements or in various combinations with or without other features and elements. The methods or flow charts provided herein may be implemented in a computer program, software, or firmware incorporated in a computer-readable (non-transitory) storage medium for execution by a general-purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

It should be understood that system, e.g., client devices, servers, controllers and the various other devices that implement the radio access/core network may be implemented with one or more processors. Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application-Specific Integrated Circuits (ASICs), Field-Programmable Gate Arrays (FPGAs) circuits, any other type of integrated circuit (IC), and/or a state machine.

What is claimed is:

1. A wireless communication system for use with radio access network with a plurality of client devices each having an associated session, the system comprising:
a session layer mobile spectrum valley scheduling controller including a processor configured to receive session information from the radio access network from each of the plurality of client devices, the session information including a utility associated with each session, the mobile spectrum valley scheduling controller being configured to generate a packet transmission schedule for valley time slots of a spectrum valley based on the utility associated with each session, deciding which session gets to use which time slot during the mobile spectrum valley, shifting packets from a busy period of time to a less busy period of time.

2. The system of claim 1, further comprising a session usage detector coupled to the radio access network, the session usage detector being configured to generate the session information.

3. The system of claim 2, wherein the spectrum usage detector is a stand-alone device having an associated processor.

4. The system of claim 1, wherein the scheduling controller generates the schedule based on a set of constraints including the utility associated with each session and at least one of: efficiency, fairness, and economic considerations.

5. The system of claim 4, wherein the fairness constraint is based on a number of objects or total number of bytes accumulated over past time periods for each client device.

6. The system of claim 5, wherein the fairness constraint can be modified through weights assigned to different client devices or different content providers.

7. The system of claim 1, wherein the scheduling controller is configured to maximize a sum of the utilities associated with a given schedule.

8. The system of claim 1, wherein the scheduling controller is configured to generate a schedule for each spectrum valley as more valley timeslots are detected.

9. The system of claim 8, wherein the scheduling controller is configured to pause sessions as valley timeslots come to an end and resume sessions when more valley timeslots are detected.

10. A wireless communication method for use with radio access network with a plurality of client devices each having an associated session, the method comprising:
receiving session information from the radio access network for each of the plurality of client devices, the session information including a utility associated with each session;
generating a packet transmission schedule for valley time slots of a spectrum valley based on the utility associated with each session, deciding which session gets to use which time slot during the mobile spectrum valley, shifting packets from a busy period of time to a less busy period of time.

11. The method of claim 10, further comprising providing a session usage detector coupled to the radio access network, the session usage detector being configured to generate the session information.

12. The method of claim 11, wherein the spectrum usage detector is a stand-alone device having an associated processor.

13. The method of claim 10, further comprising generating the schedule based on a set of constraints including the utility associated with each session and at least one of: efficiency, fairness, and economic considerations.

14. The method of claim 13, wherein the fairness constraint is based on a number of objects or total number of bytes accumulated over past time periods for each client device.

15. The method of claim 14, wherein the fairness constraint can be modified through weights assigned to different client devices or different content providers.

16. The method of claim 10, further comprising generating a schedule that maximizes a sum of the utilities associated with a given schedule.

17. The method of claim 10, further comprising generating a schedule for each spectrum valley as more valley timeslots are detected.

18. The method of claim 17, wherein the sessions are paused as valley timeslots come to an end and sessions are resumed when more valley timeslots are detected.

* * * * *